United States Patent
Minagata et al.

(10) Patent No.: US 9,853,319 B2
(45) Date of Patent: Dec. 26, 2017

(54) ELECTRICITY-STORAGE DEVICE

(71) Applicant: KABUSHIKI KAISHA TOYOTA JIDOSHOKKI, Kariya-shi, Aichi-ken (JP)

(72) Inventors: Atsushi Minagata, Kariya (JP); Motoaki Okuda, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/126,417

(22) PCT Filed: Mar. 9, 2015

(86) PCT No.: PCT/JP2015/056839
§ 371 (c)(1),
(2) Date: Sep. 15, 2016

(87) PCT Pub. No.: WO2015/146562
PCT Pub. Date: Oct. 1, 2015

(65) Prior Publication Data
US 2017/0084946 A1 Mar. 23, 2017

(30) Foreign Application Priority Data
Mar. 26, 2014 (JP) .................. 2014-063569

(51) Int. Cl.
*H01M 4/04* (2006.01)
*H01M 10/04* (2006.01)
(Continued)

(52) U.S. Cl.
CPC ........ *H01M 10/0468* (2013.01); *H01G 11/06* (2013.01); *H01G 11/12* (2013.01);
(Continued)

(58) Field of Classification Search
CPC ......... H01M 10/0468; H01M 10/0525; H01M 10/0413; H01M 10/0585; H01M 2/266;
(Continued)

(56) References Cited

U.S. PATENT DOCUMENTS

2001/0041288 A1* 11/2001 Onishi .................. H01M 2/266
429/161
2013/0284531 A1   10/2013 Oonuma et al.
2014/0193710 A1    7/2014 Hasegawa

FOREIGN PATENT DOCUMENTS

JP     07-220753 A    8/1995
JP   2007-335307 A   12/2007
(Continued)

OTHER PUBLICATIONS

International Preliminary Report on Patentability issued from the International Bureau in counterpart International Application No. PCT/JP2015/056839, dated Sep. 27, 2016.

*Primary Examiner* — Stephen Yanchuk
(74) *Attorney, Agent, or Firm* — Sughrue Mion, PLLC (57) ABSTRACT

An electrode assembly for this secondary battery has a pair of end surfaces in a layering direction. Each of said end surfaces has a facing section onto which facing regions where positive-electrode active-material layers and negative-electrode active-material layers face each other are projected. Securing tapes for securing the electrode assembly from one end face thereof to the other are laid out on top of the aforementioned facing sections. Each securing tape has a section in which, viewed in the layering direction of the electrode assembly, the tip of the securing tape attached to one end face of the electrode assembly and the tip of the securing tape attached to the other end face of the electrode assembly do not overlap.

4 Claims, 4 Drawing Sheets

(51) Int. Cl.
*H01G 11/12* (2013.01)
*H01G 11/82* (2013.01)
*H01M 10/0585* (2010.01)
*H01G 11/06* (2013.01)
*H01G 11/26* (2013.01)
*H01G 11/52* (2013.01)
*H01M 2/02* (2006.01)
*H01M 4/13* (2010.01)
*H01M 10/0525* (2010.01)

(52) U.S. Cl.
CPC ............. *H01G 11/26* (2013.01); *H01G 11/52* (2013.01); *H01G 11/82* (2013.01); *H01M 2/024* (2013.01); *H01M 4/13* (2013.01); *H01M 10/0413* (2013.01); *H01M 10/0525* (2013.01); *H01M 10/0585* (2013.01); *H01M 2220/20* (2013.01); *Y02E 60/13* (2013.01); *Y02T 10/7022* (2013.01)

(58) Field of Classification Search
CPC ........ H01M 2/024; H01M 4/13; H01G 11/06; H01G 11/82; H01G 11/52; H01G 11/26
See application file for complete search history.

(56) References Cited

FOREIGN PATENT DOCUMENTS

| | | |
|---|---|---|
| JP | 2014-011115 A | 1/2014 |
| WO | 2012/090652 A1 | 7/2012 |
| WO | 2013/031891 A1 | 3/2013 |

\* cited by examiner

ELECTRICITY-STORAGE DEVICE

CROSS REFERENCE TO RELATED APPLICATIONS

This application is a National Stage of International Application No. PCT/JP2015/056839 filed Mar. 9, 2015, claiming priority based on Japanese Patent Application No. 2014-063569 filed Mar. 26, 2014, the contents of all of which are incorporated herein by reference in their entirety.

TECHNICAL FIELD

The present invention relates to a power storage device.

BACKGROUND ART

A rechargeable battery, for example, a lithium-ion battery, is installed in a vehicle such as an electric vehicle (EV) or a plug-in hybrid vehicle (PHV). The rechargeable battery is a power storage device that stores power, which is supplied to an electric motor functioning as a prime mover. The rechargeable battery includes an electrode assembly and a case, which accommodates the electrode assembly. The electrode assembly is formed by stacking a positive electrode, which includes a positive electrode active material layer, and a negative electrode, which includes a negative electrode active material layer, with a separator located between the positive electrode and the negative electrode. Patent document 1 discloses a structure that uses fastening tapes to fasten the electrodes and the separators of the electrode assembly.

To improve the contact properties of each electrode and limit displacement of the electrodes, load may be applied in a stacking direction of the electrodes to regions where the active material layers are opposed to one another. Also, expansion of the electrode assembly during charging and discharging may result in the case applying load to the opposing regions. Further, in an assembled battery in which the rechargeable batteries are stacked and connected in series to one another, a constraining load may be applied to the rechargeable batteries in the stacking direction.

In a rechargeable battery in which a fastening tape is applied to the electrode assembly, an edge of the fastening tape forms a step on the surface of the electrode assembly. In this case, the above load has a tendency to concentrate on the step formed by the fastening tape. This may cause uneven load to be applied to the opposing regions from the case.

PRIOR ART DOCUMENT

Patent Document

Patent Document 1: Japanese Laid-Open Patent Publication No. 07-220753

SUMMARY OF THE INVENTION

Problems that are to be Solved by the Invention

It is an object of the present invention to provide a power storage device that limits concentration of load on the surface of an electrode assembly caused by edges of a fastening tape.

Means for Solving the Problem

To achieve the above problem, a first aspect of the present invention provides a power storage device that includes an electrode assembly in which a positive electrode that includes a positive electrode active material layer and a negative electrode that includes a negative electrode active material layer are stacked with a separator located between the positive electrode and the negative electrode and a case that accommodates the electrode assembly. The electrode assembly includes two end surfaces arranged in a stacking direction. Each of the two end surfaces includes an opposing portion onto which an opposing region, where the positive electrode active material layer opposes the negative electrode active material layer, is projected as viewed in the stacking direction. A fastening tape is located on the opposing portions to fasten the electrode assembly from one end surface of the electrode assembly to the other end surface of the electrode assembly. The fastening tape includes non-overlapped portions in which an edge of a portion applied to one end surface of the electrode assembly does not overlap with an edge of a portion applied to the other end surface of the electrode assembly as viewed in the stacking direction.

Even when load concentrates on the edge of the fastening tape that is applied to one end surface of the electrode assembly, the above structure hinders transmission of the load to the edge of the fastening tape that is applied to the other end surface of the electrode assembly. This limits concentration of the load on the surfaces of the electrode assembly caused by the edges of the fastening tape.

EMBODIMENTS OF THE INVENTION

One embodiment of a power storage device according to the present invention will now be described with reference to FIGS. 1 to 6.

Figure 1:
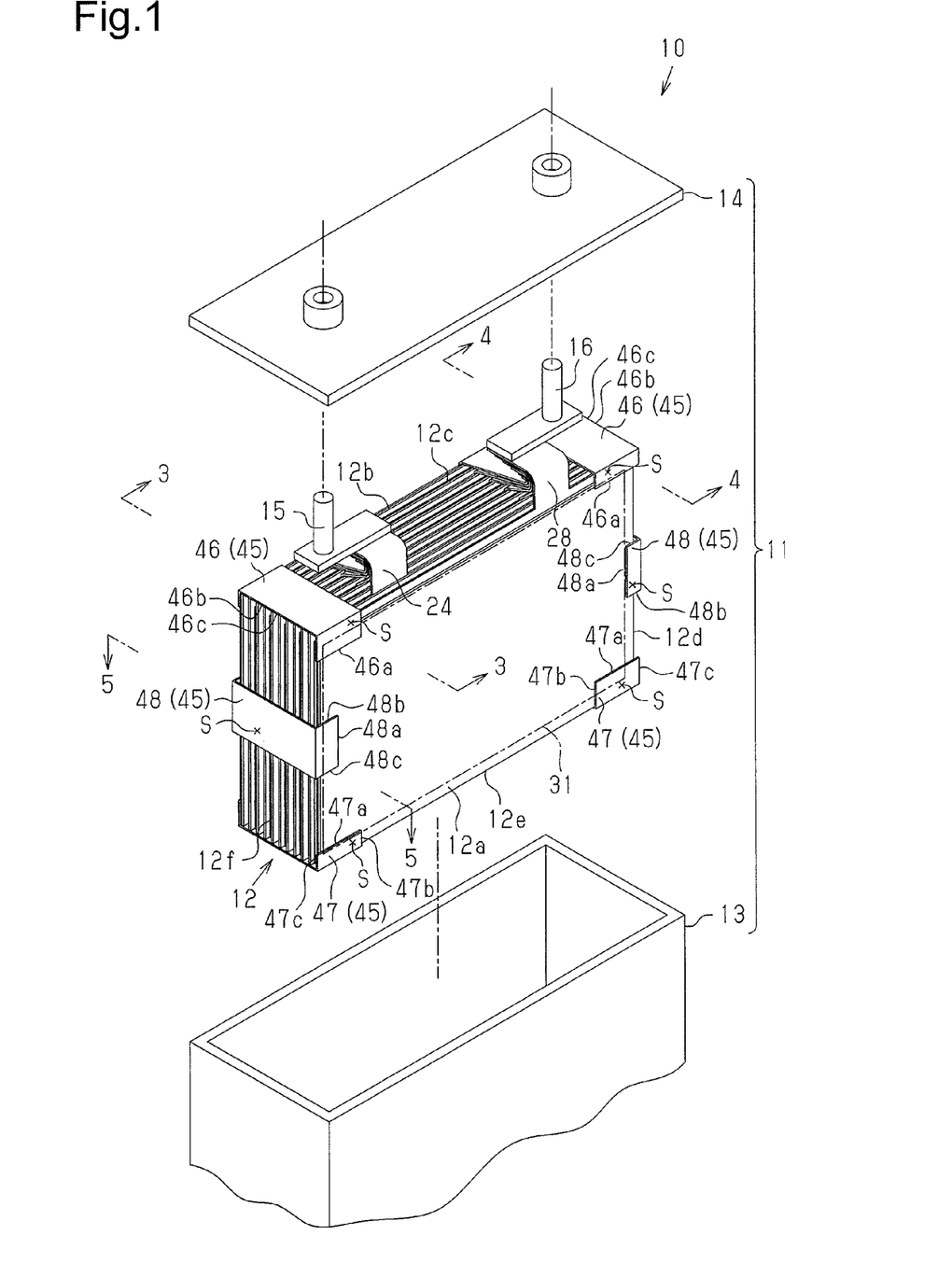
FIG. 1 is an exploded perspective view showing the present embodiment of a rechargeable battery.

As shown in FIG. 1, a rechargeable battery 10, which functions as a power storage device, includes a case 11 and an electrode assembly 12 which is accommodated in the case 11. The case 11 accommodates an electrolytic solution in addition to the electrode assembly 12. The case 11 includes a box-shaped case body 13, which has a closed end, and a rectangular plate-like cover 14. The case body 13 is provided with an opening through which the electrode assembly 12 is inserted. The cover 14 closes the opening in the case body 13. The case body 13 and the cover 14 are formed by a metal such as stainless steel or aluminum. The rechargeable battery 10 is a prismatic lithium-ion battery.

Figure 2:
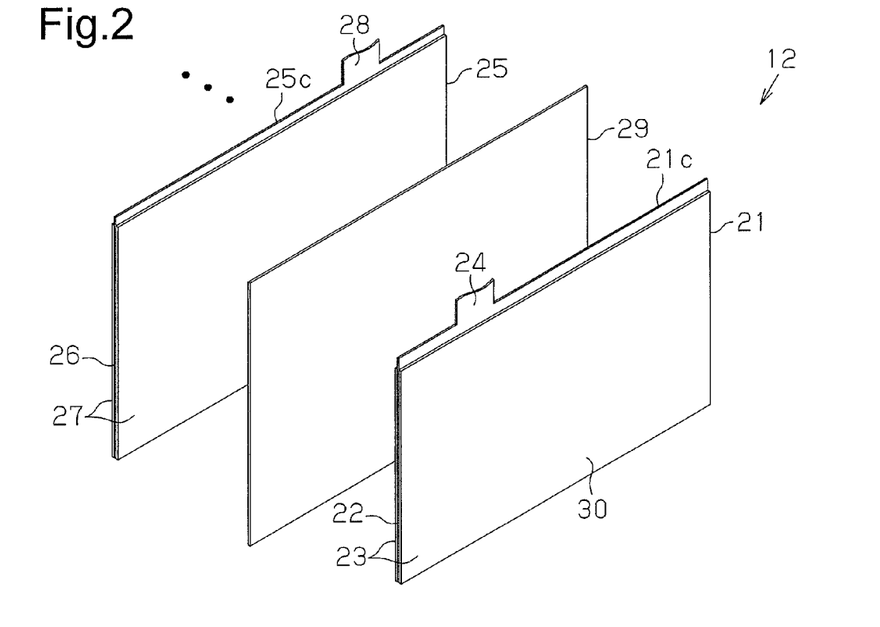
FIG. 2 is an exploded perspective view of an electrode assembly.

As shown in FIG. 2, the electrode assembly 12 is formed by alternately stacking positive electrodes 21 and negative electrodes 25 with separators 29 located between each positive electrode 21 and the corresponding negative electrode 25. The electrodes 21, 25 and the separators 29 are each rectangular. The positive electrodes 21 are smaller than the negative electrodes 25. Each side of the positive electrodes 21 is shorter than the corresponding side of the negative electrodes 25. The separators 29 are larger than the negative electrodes 25. Each side of the separators 29 is longer than the corresponding side of the negative electrodes 25.

Each positive electrode 21 includes a rectangular positive electrode metal foil 22 and positive electrode active material layers 23, which are laminated on opposite surfaces of the positive electrode metal foil 22. The positive electrode 21 is formed, for example, by an aluminum foil. The positive electrode active material layers 23 each include a positive electrode active material. The positive electrode active material layers 23 are applied to regions excluding one side 21c of the positive electrode 21. A positive electrode tab 24 projects from the side 21c of the positive electrode 21.

Each negative electrode 25 includes a rectangular negative electrode metal foil 26 and negative electrode active material layers 27, which are laminated on opposite surfaces of the negative metal electrode foil 26. The negative electrode metal foil 26 is formed, for example, by a copper foil. The negative electrode active material layers 27 each include a negative electrode active material. The shape of the negative electrode metal foil 26 is slightly larger than the shape of the positive electrode metal foil 22. The negative electrode active material layers 27 are applied to regions, which exclude one side 25c of the negative electrode 25 and are larger than the positive electrode active material layers 23. A negative electrode tab 28 projects from the side 25c of the negative electrode 25.

The electrodes 21, 25 are stacked so that the tabs 24, 28 having the same polarity overlap with one another and the tabs 24, 28 having different polarities do not overlap with one another. When the electrodes 21, 25 and the separators 29 are stacked, the positive electrode active material layers 23 oppose the negative electrode active material layers 27 with the separators 29 located between each positive electrode active material layer 23 and the corresponding negative electrode active material layer 27. The positive electrode active material layer 23 is entirely covered by the negative electrode active material layer 27 with the separator 29 located in between. Hereafter, a region where the active material layers 23, 27 oppose each other is referred to as an opposing region 30. Since the positive electrode active material layer 23 is entirely covered by the negative electrode active material layer 27, the opposing region 30 conforms in size to the positive electrode active material layer 23. More specifically, the positive electrode active material layer 23 defines the size of the opposing region 30.

Figure 3:
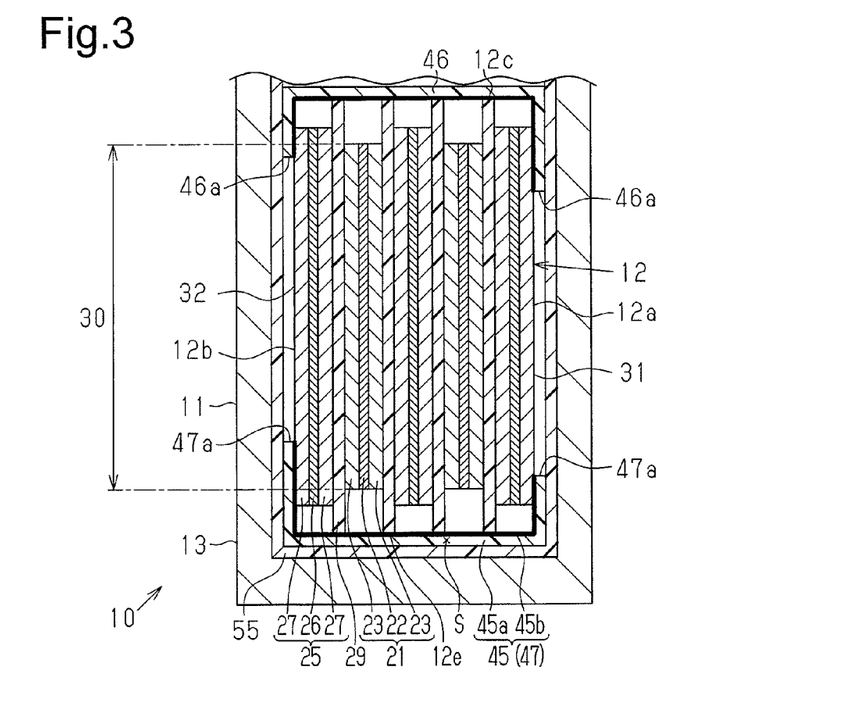
FIG. 3 is a cross-sectional view taken along line 3-3 in FIG. 1.
Figure 4:
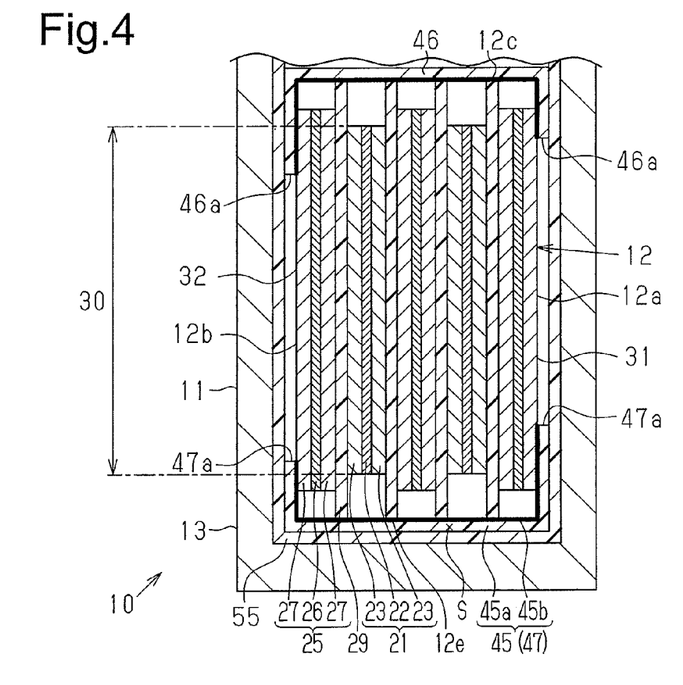
FIG. 4 is a cross-sectional view taken along line 4-4 in FIG. 1.
Figure 5:
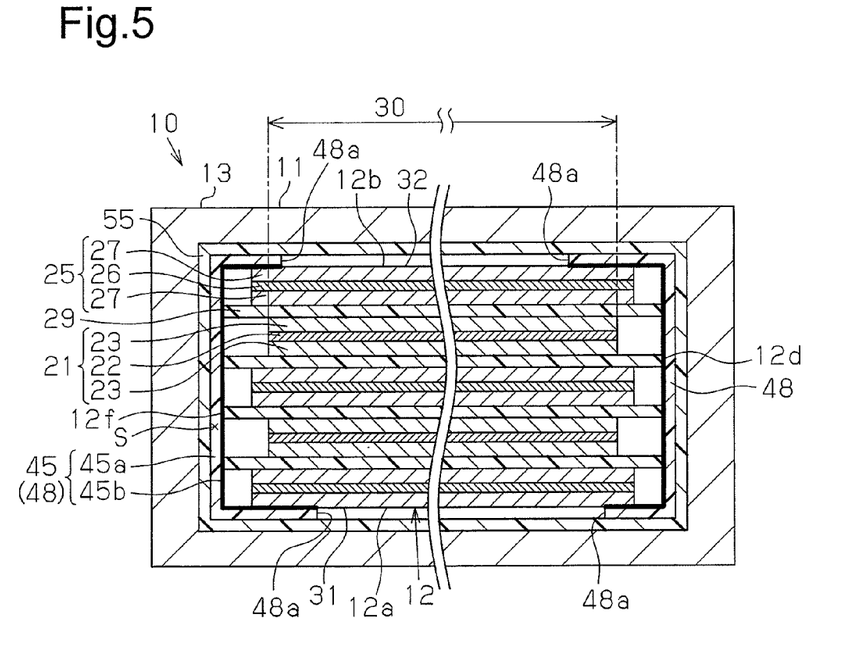
FIG. 5 is a cross-sectional view taken along line 5-5 in FIG. 1.

As shown in FIGS. 3 to 5, the electrode assembly 12 includes two end surfaces 12a, 12b located in a stacking direction. One end surface 12a of the electrode assembly 12 includes an opposing portion 31, onto which the opposing region 30 is projected as viewed in the stacking direction. In the same manner, the other end surface 12b of the electrode assembly 12 includes a further opposing portion 32, onto which the opposing region 30 is projected as viewed in the stacking direction. The opposing portions 31, 32 are flat and opposed to each other. Each of the opposing portions 31, 32 conforms in size to the positive electrode active material layer 23.

As shown in FIG. 1, the rechargeable battery 10 includes four sides in directions orthogonal to the stacking direction of the electrode assembly 12, namely, an upper side 12c, a lower side 12e, and end sides 12d, 12f. The positive electrodes 21 and the negative electrodes 25 are stacked so that the positive electrode tabs 24 and the negative electrode tabs 28 project from the upper side 12c of the rechargeable battery 10. The positive electrode tabs 24 are gathered together and bent from one end to the other end in the stacking direction of the electrode assembly 12. Overlapped portions of the positive electrode tabs 24 are welded to electrically connect the positive electrode tabs 24 to each other. In the same manner, the negative electrode tabs 28 are gathered together and bent. Overlapped portions of the negative electrode tabs 28 are welded to electrically connect the negative electrode tabs 28 to each other.

The rechargeable battery 10 includes a positive electrode terminal 15, which is electrically connected to the positive electrode tabs 24, and a negative electrode terminal 16, which is electrically connected to the negative electrode tabs 28. The cover 14 is provided with through holes, through which the terminals 15, 16 are inserted. The terminals 15, 16 are partially exposed out of the case 11 through the through holes.

Fastening tapes 45 are applied to the electrode assembly 12. The fastening tapes 45 are applied to the electrode assembly 12 from one end surface 12a to the other end surface 12b. Thus, the fastening tapes 45 fasten the electrode assembly 12 from one end surface 12a to the other end surface 12b. The electrode assembly 12 includes application regions S to which the fastening tapes 45 are applied. Thus, the electrodes 21, 25 and the separators 29 are fastened by the fastening tapes 45.

As shown in FIGS. 1 and 3 to 5, the six fastening tapes 45 are applied to the electrode assembly 12. Each fastening tape 45 is rectangular and includes a base layer 45a and an adhesive layer 45b, which is laminated on one surface of the base layer 45a. The fastening tapes 45 include two first fastening tapes 46, two second fastening tapes 47, and two third fastening tapes 48.

As shown in FIG. 1, the first fastening tapes 46 are applied to the electrode assembly 12 to extend over the upper side 12c, from which the positive electrode tabs 24 and the negative electrode tabs 28 project. The second fastening tapes 47 are applied to the electrode assembly 12 to extend over the lower side 12e. The third fastening tapes 48 are applied to extend over the corresponding end sides 12d, 12f, which connect the upper side 12c and the lower side 12e of the electrode assembly 12.

The fastening tapes 46, 47, 48 each include portions that overlap with the opposing portions 31, 32. More specifically, of the edges 46c, 47c, 48c of the fastening tapes 46, 47, 48, ends 46a, 47a, 48a extend in a direction orthogonal to a longitudinal direction of the fastening tapes 46, 47, 48 and entirely overlap with the opposing portions 31, 32. Side edges 46b, 47b, 48b extend in the longitudinal direction of the fastening tapes 46, 47, 48 and partially overlap with the opposing portions 31, 32. When the electrode assembly 12 is inserted in the case 11, portions of the fastening tapes 46, 47, 48, that is, portions of the application regions S, are located between an inner surface of the case 11 and the corresponding one of the opposing portions 31, 32. As shown in FIGS. 3 to 5, an insulation member 55 is located on the inner surface of the case body 13. Thus, when the electrode assembly 12 is inserted in the case 11, the insulation member 55 is located between each of the fastening tapes 46, 47, 48 and the inner surface of the case 11.

The fastening tapes 46, 47, 48 are applied so that the edges 46c, 47c, 48c that are applied to one end surface 12a of the electrode assembly 12 and the edges 46c, 47c, 48c that are applied to the other end surface 12b have portions that do not overlap with each other as viewed in the stacking direction of the electrode assembly 12. Additionally, the fastening tapes 46, 47, 48 are applied so that the ends 46a, 47a, 48a are applied to each of the end surfaces 12a, 12b at different positions in order to decrease differences in the contact areas of the fastening tapes 46, 47, 48 between one end surface 12a and the other end surface 12b of the electrode assembly 12.

The process for applying the fastening tapes 46, 47, 48 to the electrode assembly 12 will now be described with reference to FIGS. 1 and 3 to 6.

As shown in FIG. 1, the ends 46a of the two first fastening tapes 46 extend along the upper side 12c and the lower side 12e of the electrode assembly 12. The side edges 46b of the two first fastening tapes 46 extend along the end sides 12d, 12f of the electrode assembly 12.

Figure 6:
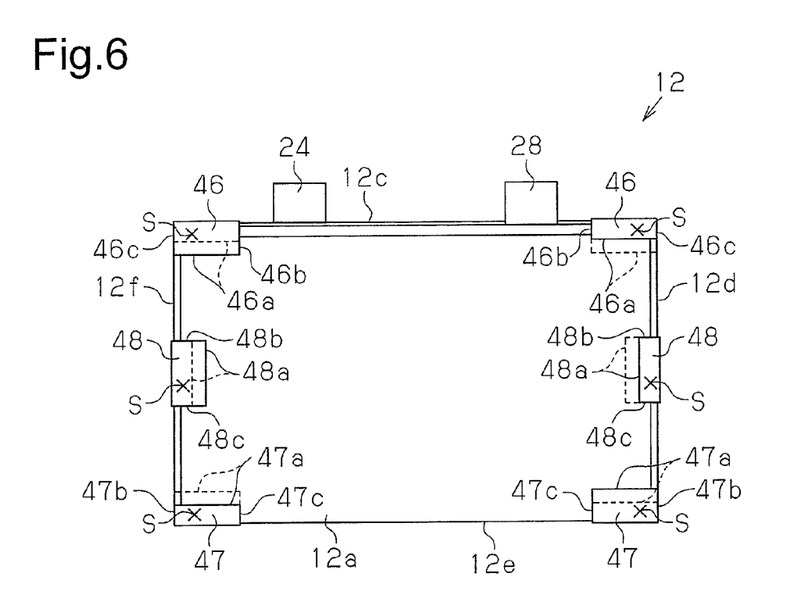
FIG. 6 is a plan view of the electrode assembly.

As shown in FIGS. 3 and 6, in one of the two first fastening tapes 46, more specifically, the first fastening tape 46 shown at the left side in FIG. 6, the end 46a that is applied to one end surface 12a of the electrode assembly 12 does not overlap with the end 46a that is applied to the other end surface 12b of the electrode assembly 12 as viewed in the stacking direction of the electrode assembly 12. More specifically, the end 46a of the first fastening tape 46 that is applied to one end surface 12a of the electrode assembly 12 is located closer to the lower side 12e of the electrode assembly 12 than the end 46a of the first fastening tape 46 that is applied to the other end surface 12b of the electrode assembly 12. Thus, the application region S on one end surface 12a of the electrode assembly 12 is larger than the application region S on the other end surface 12b of the electrode assembly 12. Additionally, the side edge 46b that is applied to one end surface 12a of the electrode assembly 12 overlaps with the side edge 46b that is applied to the other end surface 12b of the electrode assembly 12.

As shown in FIGS. 4 and 6, also, in the other one of the two first fastening tapes 46, more specifically, the first fastening tape 46 shown at the right side in FIG. 6, the end 46a that is applied to one end surface 12a of the electrode assembly 12 does not overlap with the end 46a that is applied to the other end surface 12b of the electrode assembly 12 as viewed in the stacking direction of the electrode assembly 12. Additionally, the side edge 46b that is applied to one end surface 12a of the electrode assembly 12 overlaps with the side edge 46b that is applied to the other end surface 12b of the electrode assembly 12. In the first fastening tape 46 shown at the right side in FIG. 6, the end 46a of the first fastening tape 46 that is applied to one end surface 12b of the electrode assembly 12 is located closer to the lower side 12e of the electrode assembly 12 than the end 46a of the first fastening tape 46 that is applied to the other end surface 12a of the electrode assembly 12. Thus, the application region S on one end surface 12b of the electrode assembly 12 is larger than the application region S on the other end surface 12a of the electrode assembly 12.

As shown in FIG. 1, the ends 47a of the two second fastening tapes 47 extend along the upper side 12c and the lower side 12e of the electrode assembly 12. The side edges 47b of the two second fastening tapes 47 extend along the end sides 12d, 12f of the electrode assembly 12.

As shown in FIGS. 3 and 6, in one of the two second fastening tapes 47, more specifically, the second fastening tape 47 shown at the left side in FIG. 6, the end 47a that is applied to one end surface 12a of the electrode assembly 12 does not overlap with the end 47a that is applied to the other end surface 12b of the electrode assembly 12 as viewed in the stacking direction of the electrode assembly 12. More specifically, the end 47a of the second fastening tape 47 that is applied to one end surface 12b of the electrode assembly 12 is located closer to the upper side 12c of the electrode assembly 12 than the end 47a of the second fastening tape 47 that is applied to the other end surface 12a of the electrode assembly 12. Thus, the application region S on one end surface 12b of the electrode assembly 12 is larger than the application region S on the other end surface 12a of the electrode assembly 12. Additionally, the side edge 47b that is applied to one end surface 12a of the electrode assembly 12 overlaps with the side edge 47b that is applied to the other end surface 12b of the electrode assembly 12.

As shown in FIGS. 4 and 6, also, in the other one of the two second fastening tapes 47, more specifically, the second fastening tape 47 shown at the right side in FIG. 6, the end 47a that is applied to one end surface 12a of the electrode assembly 12 does not overlap with the end 47a that is applied to the other end surface 12b of the electrode assembly 12 as viewed in the stacking direction of the electrode assembly 12. Additionally, the side edge 47b that is applied to one end surface 12a of the electrode assembly 12 overlaps with the side edge 47b that is applied to the other end surface 12b of the electrode assembly 12. In the second fastening tape 47 shown at the right side in FIG. 6, the end 47a of the second fastening tape 47 that is applied to one end surface 12a of the electrode assembly 12 is located closer to the upper side 12c of the electrode assembly 12 than the end 47a of the second fastening tape 47 that is applied to the other end surface 12b of the electrode assembly 12. Thus, the application region S on one end surface 12a of the electrode assembly 12 is larger than the application region S on the other end surface 12b of the electrode assembly 12.

As shown in FIG. 1, the ends 48a of the two third fastening tapes 48 extend along the end sides 12d, 12f of the electrode assembly 12. The side edges 48b of the two third fastening tapes 48 extend along the upper side 12c and the lower side 12e of the electrode assembly 12.

As shown in FIGS. 5 and 6, in one of the two third fastening tapes 48, more specifically, the third fastening tape 48 shown at the left side in FIG. 6, the end 48a that is applied to one end surface 12a of the electrode assembly 12 does not overlap with the end 48a that is applied to the other end surface 12b of the electrode assembly 12 as viewed in the stacking direction of the electrode assembly 12. More specifically, the end 48a of the third fastening tape 48 that is applied to one end surface 12a of the electrode assembly 12 is located closer to the end side 12d of the electrode assembly 12 than the end 48a of the third fastening tape 48 that is applied to the other end surface 12b of the electrode assembly 12. Thus, the application region S on one end surface 12a of the electrode assembly 12 is larger than the application region S on the other end surface 12b of the electrode assembly 12. Additionally, the side edge 48b that is applied to one end surface 12a of the electrode assembly 12 overlaps with the side edge 48b that is applied to the other end surface 12b of the electrode assembly 12.

Also, in the other one of the two third fastening tapes 48, more specifically, the third fastening tape 48 shown at the right side in FIG. 6, the end 48a that is applied to one end surface 12a of the electrode assembly 12 does not overlap with the end 48a that is applied to the other end surface 12b of the electrode assembly 12 as viewed in the stacking direction of the electrode assembly 12. Additionally, the side edge 48b that is applied to one end surface 12a of the electrode assembly 12 overlaps with the side edge 48b that is applied to the other end surface 12b of the electrode assembly 12. In the third fastening tape 48 shown at the right side in FIG. 6, the end 48a of the third fastening tape 48 that is applied to one end surface 12b of the electrode assembly 12 is located closer to the end side 12f of the electrode assembly 12 than the end 48a of the third fastening tape 48 that is applied to the other end surface 12a of the electrode assembly 12. Thus, the application region S on one end surface 12b of the electrode assembly 12 is larger than the application region S on the other end surface 12a of the electrode assembly 12.

The operation of the rechargeable battery 10 will now be described.

The load applied to the opposing regions 30 of the electrode assembly 12 is transmitted from one end surface 12a to the other end surface 12b of the electrode assembly 12. Particularly, when load is applied to the ends 46a, 47a, 48a of the fastening tapes 46, 47, 48 that are applied to one end surface 12a of the electrode assembly 12, the load is transmitted to a particular load range of the other end surface 12b of the electrode assembly 12. The particular load range includes a portion where the ends 46a, 47a, 48a of the fastening tapes 46, 47, 48 that are applied to one end surface 12a of the electrode assembly 12 overlap with the other end surface 12b of the electrode assembly 12 as viewed in the stacking direction of the electrode assembly 12.

The load applied to the opposing regions 30 of the electrode assembly 12 is also transmitted from one end surface 12b to the other end surface 12a of the electrode assembly 12. Thus, in the same manner as described above, when load is applied to the ends 46a, 47a, 48a of the fastening tapes 46, 47, 48 that are applied to one end surface 12b of the electrode assembly 12, the load is transmitted to a particular load range of the other end surface 12a of the electrode assembly 12. The particular load range includes a portion where the ends 46a, 47a, 48a of the fastening tapes 46, 47, 48 that are applied to one end surface 12b of the electrode assembly 12 overlap with the other end surface 12a of the electrode assembly 12 as viewed in the stacking direction of the electrode assembly 12.

In the present embodiment, the ends 46a, 47a, 48a of the fastening tapes 46, 47, 48 that are applied to one end surface 12a of the electrode assembly 12 do not overlap with the ends 46a, 47a, 48a of the corresponding fastening tapes 46, 47, 48 that are applied to the other end surface 12b of the electrode assembly 12 as viewed in the stacking direction of the electrode assembly 12. More specifically, as shown in FIG. 6, when the edges 46c, 47c, 48c of the fastening tapes 46, 47, 48 that are located on one end surface 12b of the electrode assembly 12 are projected onto the other end surface 12a of the electrode assembly 12, contours reflected on one end surface 12a include portions that do not overlap with the edges 46c, 47c, 48c of the fastening tapes 46, 47, 48 located on the other end surface 12a. Consequently, the ends 46a, 47a, 48a of the fastening tapes 46, 47, 48 are entirely excluded from the load ranges of the end surfaces 12a, 12b of the electrode assembly 12. This limits local concentration of load on the electrode assembly 12 that is applied from the ends 46a, 47a, 48a of the fastening tapes 46, 47, 48 to one end surface 12a of the electrode assembly 12 and the other end surface 12b of the electrode assembly 12. The load ranges are determined based on the hardness and the expansion coefficient of the electrodes 21, 25, a gap between the inner surface of the case 11 and the electrode assembly 12, the constraining load of the rechargeable battery 10, the thickness of the fastening tapes 45, and the like.

As described above, in one of the two first fastening tapes 46, the application region S on one end surface 12a of the electrode assembly 12 is larger than the application region S on the other end surface 12b of the electrode assembly 12. In the other one of the two first fastening tapes 46, the application region S on the one end surface 12b of the electrode assembly 12 is larger than the application region S on the other end surface 12a of the electrode assembly 12. Also, in one of the two second fastening tapes 47, the application region S on one end surface 12b of the electrode assembly 12 is larger than the application region S on the other end surface 12a of the electrode assembly 12. In the other one of the two second fastening tapes 47, the application region S on one end surface 12a of the electrode assembly 12 is larger than the application region S on the other end surface 12b of the electrode assembly 12. Also, in one of the two third fastening tapes 48, the application region S on one end surface 12a of the electrode assembly 12 is larger than the application region S on the other end surface 12b of the electrode assembly 12. In the other one of the two third fastening tapes 48, the application region S on one end surface 12b of the electrode assembly 12 is larger than the application region S on the other end surface 12a of the electrode assembly 12. When the fastening tapes 46, 47, 48 are applied to the end surfaces 12a, 12b of the electrode assembly 12 in this manner, the difference in the application regions S of the fastening tapes 46, 47, 48 decreases between one end surface 12a and the other end surface 12b of the electrode assembly 12.

The present embodiment has the advantages described below.

(1) In each of the fastening tapes 46, 47, 48, the ends 46a, 47a, 48a that are applied to one end surface 12a of the electrode assembly 12 do not overlap with the ends 46a, 47a, 48a that are applied to the other end surface 12b of the electrode assembly 12 as viewed in the stacking direction of the electrode assembly 12. Thus, even when load concentrates on the ends 46a, 47a, 48a of the fastening tapes 46, 47, 48 that are applied to one of the end surfaces 12a, 12b of the electrode assembly 12, limited load is transmitted to the ends 46a, 47a, 48a of the fastening tapes 46, 47, 48 that are applied to the other one of the end surfaces 12a, 12b. This limits the concentration of the load on the surfaces of the electrode assembly 12 caused by the edges 46c, 47c, 48c of the fastening tapes 46, 47, 48.

(2) The ends 46a, 47a, 48a of the fastening tapes 46, 47, 48 that are applied to one end surface 12a of the electrode assembly 12 do not overlap with the ends 46a, 47a, 48a of the fastening tapes 46, 47, 48 that are applied to the other end surface 12b of the electrode assembly 12. Thus, the proportion of non-overlapped portions of the fastening tapes 46, 47, 48 is increased as compared to when only portions of the ends 46a, 47a, 48a of the fastening tapes 46, 47, 48 do not overlap with each other. This further limits the concentration of the load on the surfaces of the electrode assembly 12 caused by the edges 46c, 47c, 48c of the fastening tapes 46, 47, 48.

(3) In each of the fastening tapes 46, 47, 48, the side edges 46b, 47b, 48b that are applied to one end surface 12a of the electrode assembly 12 overlap with the side edges 46b, 47b, 48b that are applied to the other end surface 12b of the electrode assembly 12. This improves the properties of the fastening tapes 46, 47, 48 for holding the electrode assembly 12 as compared to when both of the ends 46a, 47a, 48a and the side edges 46b, 47b, 48b do not overlap with each other. Thus, displacement is effectively limited between the electrodes 21, 25 of the electrode assembly 12.

(4) The fastening tapes 46, 47, 48 are applied to the electrode assembly 12 so that the differences in the application regions S of the fastening tapes 46, 47, 48 are decreased between one end surface 12a and the other end surface 12b of the electrode assembly 12. This decreases the differences in the contact areas of the fastening tapes 46, 47, 48 between one end surface 12*a* and the other end surface 12*b* of the electrode assembly 12. Consequently, load is uniformly applied to the end surfaces 12*a*, 12*b* of the electrode assembly 12 from the fastening tapes 46, 47, 48.

The above embodiment may be modified as follows.

Figure 7:
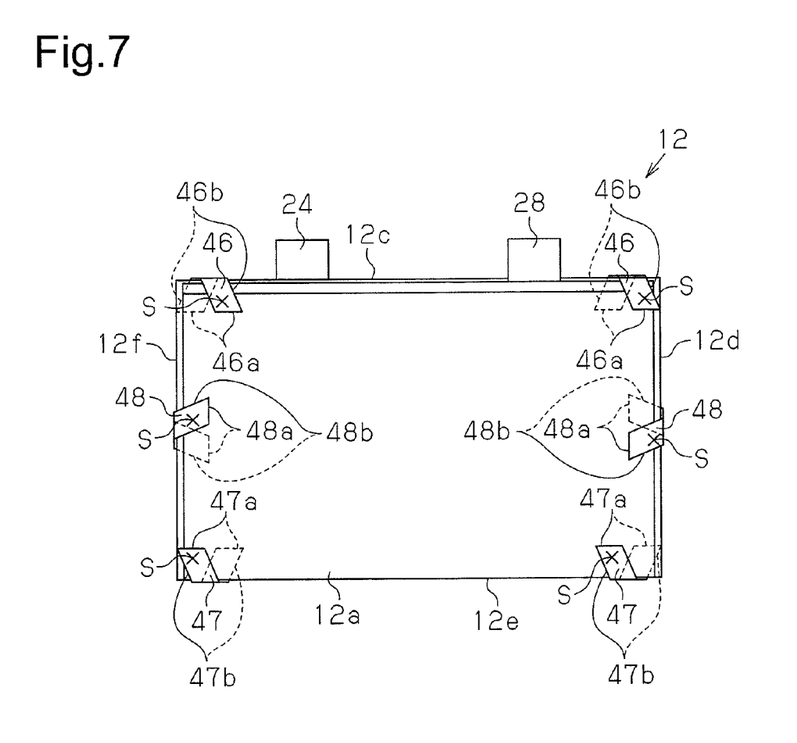
FIG. 7 is a plan view showing another embodiment of an electrode assembly.

In addition to the ends 46*a*, 47*a*, 48*a* of the fastening tapes 46, 47, 48, the side edges 46*b*, 47*b*, 48*b* do not have to overlap with each other on one end surface 12*a* and the other end surface 12*b* of the electrode assembly 12 as viewed in the stacking direction of the electrode assembly 12. For example, as shown in FIG. 7, parallelogram fastening tapes 46, 47, 48 may be applied to the electrode assembly 12. Alternatively, in the same manner as the fastening tapes 46, 47, 48 shown in FIG. 7, rectangular fastening tapes 46, 47, 48 may be applied to the electrode assembly 12 to separate the fastening tapes 46, 47, 48 on one end surface 12*a* and the other end surface 12*b* of the electrode assembly 12. These embodiments have the advantage described below in addition to (1), (2), (4) of the above embodiment.

(5) In addition to the ends 46*a*, 47*a*, 48*a* of the fastening tapes 46, 47, 48, the side edges 46*b*, 47*b*, 48*b* do not overlap with each other as viewed in the stacking direction of the electrode assembly 12. Thus, the proportion of non-overlapped portions of the fastening tapes 45 is increased as compared to when only portions of the ends 46*a*, 47*a*, 48*a* of the fastening tapes 46, 47, 48 do not overlap with each other. This further limits the concentration of the load on the surfaces of the electrode assembly 12 caused by the edges 46*c*, 47*c*, 48*c* of the fastening tapes 46, 47, 48.

Only portions of the ends 46*a*, 47*a*, 48*a* of the fastening tapes 46, 47, 48 do not have to overlap with each other on the end surface 12*a* and the end surface 12*b* of the electrode assembly 12 as viewed in the stacking direction of the electrode assembly 12. This embodiment has the same advantages as (1), (3), and (4) of the above embodiment.

To decrease the difference in the contact areas of the fastening tapes 46, 47, 48 between the end surface 12*a* and the end surface 12*b* of the electrode assembly 12, an embodiment that differs from the above embodiment may be used to apply the fastening tapes 46, 47, 48 to the electrode assembly 12. For example, in one of the two first fastening tapes 46, more specifically, the first fastening tape 46 shown at the left side in FIG. 6, the application region S on the end surface 12*b* of the electrode assembly 12 may be larger than the application region S on the end surface 12*a* of the electrode assembly 12. Also, in the other one of the two first fastening tapes 46, more specifically, the first fastening tape 46 shown at the right side in FIG. 6, the application region S on one end surface 12*a* of the electrode assembly 12 may be larger than the application region S on other end surface 12*b* of the electrode assembly 12.

The fastening tapes 46, 47, 48 may be applied to the electrode assembly 12 so that a difference in the application regions S of the fastening tapes 46, 47, 48 is produced between one end surface 12*a* and the other end surface 12*b* of the electrode assembly 12. The fastening tapes 46, 47, 48 may be applied so that, for example, the total of the application regions S on one end surface 12*a* of the electrode assembly 12 is larger than the total of the application regions S on the other end surface 12*b* of the electrode assembly 12. This embodiment has the same advantages as (1) to (3) of the above embodiment.

Each fastening tape 45 may include the adhesive layer 45*b* entirely applied to one surface of the base layer 45*a*. Alternatively, each fastening tape 45 may include the adhesive layer 45*b* applied to one surface of the base layer 45*a* on only portions that are applied to the end surfaces 12*a*, 12*b* of the electrode assembly 12.

The number, position, and shape of the fastening tapes 45 applied to the electrode assembly 12 may be freely set.

The negative electrodes 25 and the separators 29 may have the same size.

The positive electrodes 21 and the negative electrodes 25 may have the same size.

A foil formed by a metal other than aluminum may be used as the positive electrode metal foil 22.

A foil formed by a metal other than copper may be used as the negative electrode metal foil 26.

The positive electrode active material layers 23 may be applied to the entire region of the positive electrode 21 excluding the positive electrode tab 24.

The positive electrode active material layer 23 may be only applied to one surface of the positive electrode 21.

The negative electrode active material layers 27 may be applied to the entire region of the negative electrode 25 excluding the negative electrode tab 28.

The negative electrode active material layer 27 may be only applied to one surface of the negative electrode 25.

The electrode assembly 12 is not limited to the stacked type. The electrode assembly 12 may be of a wound type in which a strip of the positive electrode and a strip of the negative electrode are wound and stacked in layers. In this embodiment, a fastening tape is applied to the electrode assembly to fasten winding ends of the electrodes. In this case, the fastening tape is applied so that an edge that is applied to one end surface of the electrode assembly does not partially overlap with an edge that is applied to the other end surface of the electrode assembly as viewed in the stacking direction of the electrode assembly.

The rechargeable battery 10 may be a rechargeable battery other than a lithium-ion rechargeable battery. The rechargeable battery 10 only needs to be a battery that exchanges charge when ions move between a positive electrode active material layer and a negative electrode active material layer.

The present invention may be embodied in a power storage device such as an electric double-layer capacitor.

The invention claimed is:

1. A power storage device comprising:
an electrode assembly in which a positive electrode that includes a positive electrode active material layer and a negative electrode that includes a negative electrode active material layer are stacked with a separator located between the positive electrode and the negative electrode;
a case that accommodates the electrode assembly, wherein
the electrode assembly includes a first end surface and a second end surface on an opposite side of the electrode assembly from the first end surface in a stacking direction; and
fastening tapes extending from the first end surface of the electrode assembly to the second end surface of the electrode assembly to fasten the electrode assembly, wherein the fastening tapes include:
a first fastening tape having a first end disposed on the first end surface of the electrode assembly and a second end disposed on the second end surface of the electrode assembly, wherein the first end of the first fastening tape on the first end surface of the electrode assembly extends further away from a first side of the electrode assembly than the second end of the first fastening tape on the second end surface of the electrode assembly, a second fastening tape having a first end disposed on the first end surface of the electrode assembly and a second end disposed on the second end surface of the electrode assembly, wherein the second end of the second fastening tape on the second end surface of the electrode assembly extends further away from a second side of the electrode assembly than the first end of the second fastening tape on the first end surface of the electrode assembly.

2. The power storage device according to claim 1, wherein the first fastening tape arranged on the first side and the second fastening tape arranged on the second side of the electrode assembly are arranged in a planar direction that extends along the end surfaces, in the first fastening tape arranged on the first side, an application region in the first end surface of the electrode assembly is larger than an application region in the second end surface of the electrode assembly, and in the second fastening tape arranged on the second side, an application region in the second end surface of the electrode assembly is larger than an application region in the first end surface of the electrode assembly.

3. The power storage device according to claim 1, wherein the power storage device is a rechargeable battery.

4. The power storage device according to claim 1, wherein each of the first and second end surfaces of the electrode assembly includes an opposing portion onto which an opposing region, where the positive electrode active material layer opposes the negative electrode active material layer, is projected as viewed in the stacking direction, and the first and second ends of each of the first and second fastening tapes is located on the opposing portions to fasten the electrode assembly.

* * * * *